United States Patent
Roth et al.

(10) Patent No.: US 10,503,917 B2
(45) Date of Patent: *Dec. 10, 2019

(54) PERFORMING OPERATIONS ON INTELLIGENT STORAGE WITH HARDENED INTERFACES

(71) Applicant: Amazon Technologies, Inc., Reno, NV (US)

(72) Inventors: Gregory B. Roth, Seattle, WA (US); Eric Jason Brandwine, Haymarket, VA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/186,893

(22) Filed: Nov. 12, 2018

(65) Prior Publication Data

US 2019/0080099 A1    Mar. 14, 2019

Related U.S. Application Data

(63) Continuation of application No. 14/673,350, filed on Mar. 30, 2015, now Pat. No. 10,127,389.

(51) Int. Cl.
    *G06F 21/60*    (2013.01)
(52) U.S. Cl.
    CPC ................... *G06F 21/602* (2013.01)
(58) Field of Classification Search
    CPC .................................................... G06F 21/602
    See application file for complete search history.

(56) References Cited

U.S. PATENT DOCUMENTS

| | | | |
|---|---|---|---|
| 6,327,595 B1* | 12/2001 | Lyson | G06F 21/6227 |
| 7,639,819 B2* | 12/2009 | Ho | G06F 21/6227 380/277 |
| 8,170,213 B1* | 5/2012 | Harwood | H04L 9/0822 380/277 |
| 2002/0037081 A1* | 3/2002 | Rogoff | G11B 20/00086 380/278 |

(Continued)

OTHER PUBLICATIONS http://en.wikipedia.org/wiki/ARM_architecture (Mar. 2015).

(Continued)

*Primary Examiner* — Kambiz Zand
*Assistant Examiner* — Thanh H Le
(74) *Attorney, Agent, or Firm* — Hogan Lovells US LLP

(57) ABSTRACT

A storage device can include processing and cryptographic capability enabling the device to function as a hardware security module (HSM). This includes the ability to encrypt and decrypt data using a cryptographic key, as well as to perform processing using such a key, independent of whether that processing involves data stored on the device. An internal key can be provided to the drive, whether provided before customer software access or received wrapped in another key, etc. That key enables the device to perform secure processing on behalf of a user or entity, where that key is not exposed to other components in the network or environment. A key may have specified tasks that can be performed using that key, and can be discarded after use. In some embodiments, firmware is provided that can cause a storage device to function as an HSM and/or processing device with cryptographic capability.

20 Claims, 7 Drawing Sheets

(56) References Cited

U.S. PATENT DOCUMENTS

| | | | |
|---|---|---|---|
| 2005/0268114 A1* | 12/2005 | Thibadeau | G06F 21/805 |
| | | | 713/189 |
| 2008/0219449 A1* | 9/2008 | Ball | G06F 21/80 |
| | | | 380/277 |
| 2010/0070466 A1* | 3/2010 | Prahlad | G06F 3/0605 |
| | | | 707/609 |
| 2010/0088527 A1* | 4/2010 | Johnson | A63F 13/02 |
| | | | 713/193 |
| 2013/0145177 A1* | 6/2013 | Cordella | G06F 12/1408 |
| | | | 713/193 |

OTHER PUBLICATIONS

U.S. Non-final Office Action issued in U.S. Appl. No. 14/673,350 dated Sep. 26, 2016.
U.S. Final Office Action issued in U.S. Appl. No. 14/673,350 dated May 8, 2017.
U.S. Non-final Office Action issued in U.S. Appl. No. 14/673,350 dated Feb. 2, 2018.
U.S. Notice of Allowance issued in U.S. Appl. No. 14/673,350 dated Jul. 25, 2018.

* cited by examiner

PERFORMING OPERATIONS ON INTELLIGENT STORAGE WITH HARDENED INTERFACES

CROSS-REFERENCE TO RELATED APPLICATIONS

This application is a continuation of U.S. patent application Ser. No. 14/673,350, entitled "PERFORMING OPERATIONS ON INTELLIGENT STORAGE WITH HARDENED INTERFACES" filed Mar. 30, 2015, which is hereby incorporated by reference in its entirety for all purposes.

BACKGROUND

The security of computing resources and associated data is of high importance in many contexts. As an example, organizations often utilize networks of computing devices to provide a robust set of services to their users. Networks often span multiple geographic boundaries and connect with other networks. An organization, for example, may support its operations using both internal networks of computing resources and computing resources managed by others. Computers of the organization may communicate with computers of other organizations to access and/or provide data while using services of another organization. In many instances, organizations configure and operate remote networks using hardware managed by other organizations, thereby reducing infrastructure costs and achieving other advantages. With such configurations of computing resources, ensuring that access to the resources and the data they hold is secure can be challenging, especially as the size and complexity of such configurations grow. One of the endemic problems in storage encryption is that the amount of data stored can be quite large, and can require storage over a long period of time. Due to the length of time the data is stored, it is important that security is managed properly over that time. Any mistake in security management can be difficult to correct due to the sheer volume of data that is stored. In many instances one or more cryptographic keys can be used to encrypt the data in order to attempt to prevent unauthorized access to the data by anyone not having a copy of the relevant key(s). Unauthorized users, devices, or applications can obtain or intercept copies of these keys, however, which can potentially expose the data outside its intended audience. The need for components outside the storage devices to have access to these keys to perform various operations increases the chances that these keys will be obtained by unintended parties.

BRIEF DESCRIPTION OF THE DRAWINGS

Various embodiments in accordance with the present disclosure will be described with reference to the drawings, in which.

DETAILED DESCRIPTION

Figure 1:
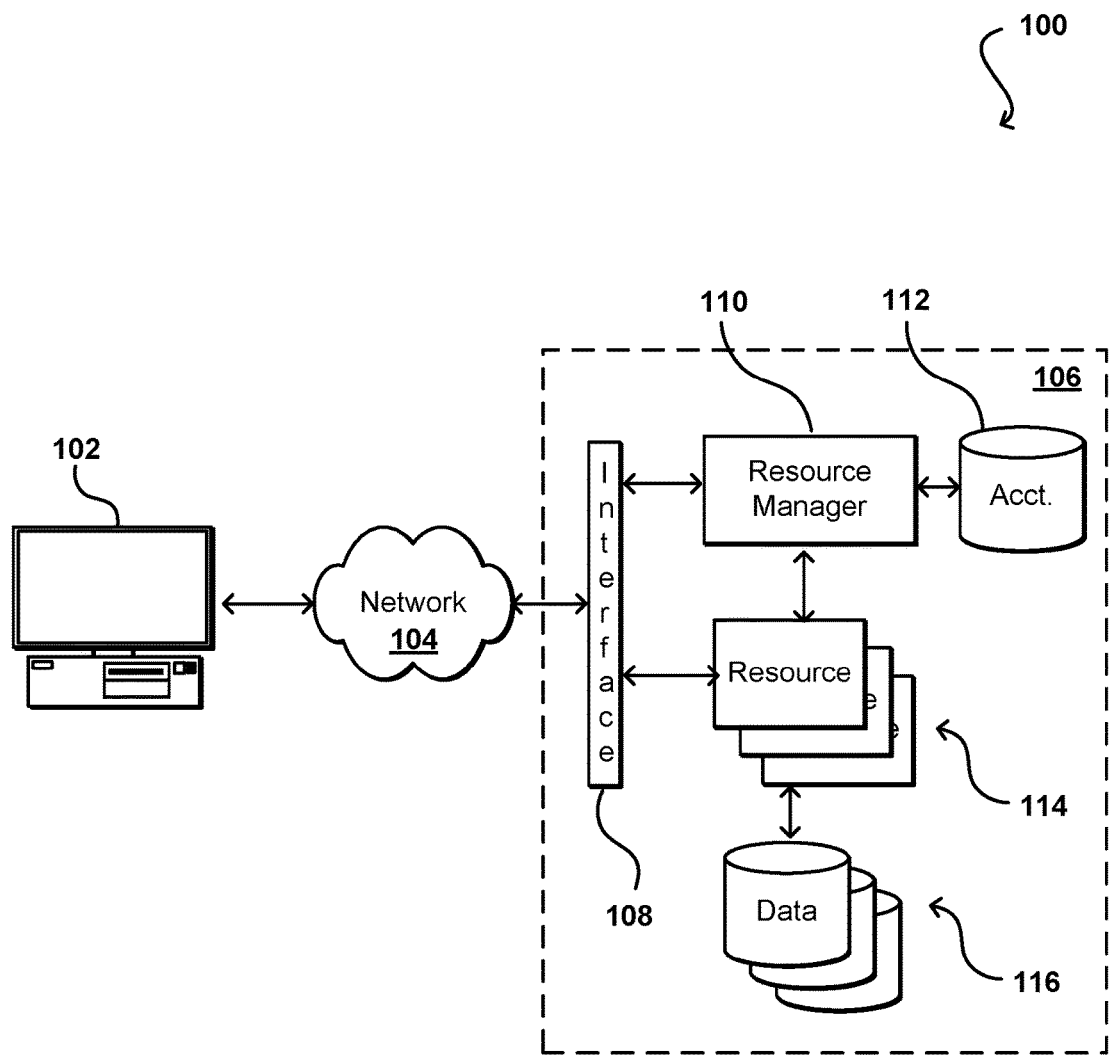
FIG. 1 illustrates an example environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the storage of data, as may be performed in a single storage device, a distributed system, or a data storage service, among other such options. A user, such as a customer of a resource provider or multi-tenant service provider, for example, may want to cause encrypted data to be stored in a data storage service, such as may include a disk array provided by the service provider in a multi-tenant environment. The user might want to encrypt the data using a specific cryptographic key, as may be obtained from a key management service or other such source. The user can cause the data to be encrypted under the specified key and transmitted to the data storage service for storage (or another such data storage operation).

A data storage system in the multi-tenant service provider environment can receive the encrypted data and cause the data to be stored in its encrypted form. In various embodiments, the data storage service can also receive a copy of the key that was used to encrypt the user data. The data storage service then can have the ability to decrypt the data using the key, in order to cause ciphertext to be converted to cleartext or plaintext, for example. While the data storage service could store the cleartext, the user (or service provider, etc.) may prefer to have the data stored in encrypted form for security purposes.

In at least some embodiments a storage device of such a service can include processing and/or cryptographic capability enabling the device to function as a hardware security module (HSM) or similar such device. The storage device can have the ability to encrypt and decrypt data using a cryptographic key that is securely stored within the storage device, the key being generated within the device or received from another HSM in a secure fashion, among other such options. For example, an internal key can be provided to a storage device, whether received wrapped in another key or provided at a stage such as during manufacture, prior to installation in a server or other such system, prior to accessibility by customer software, and the like. The storage device can also perform various processing tasks using such a key in some embodiments, independent of whether the processing involves data stored on the device. A secure internal key can enable the storage device to perform secure processing on behalf of a user or entity, where that key is not exposed to other components in the network or environment. A secure internal key may have specified tasks that can be performed using that key, and can be discarded after use in some embodiments. In some embodiments, firmware is provided that can cause a storage device to function as an HSM and/or a processing device with cryptographic capability. An additional advantage to providing cryptographic capability in a storage device is that an existing storage device in a system can be replaced using a device with cryptographic capability, for example, where the device can continue to perform as originally intended in the system, without modification to existing software or hardware, but then can also provide the additional functionality discussed and suggested herein.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

In an example wherein a storage operation command is to be transmitted to the appropriate data storage device in the provider embodiment, a digitally signed request, such as an API request, can be received that may be formatted in various ways in accordance with various embodiments. For example, in some embodiments, the request is a web service request received over a network. The request may be transmitted in accordance with an application level protocol, such as the HyperText Transfer Protocol (HTTP). The request may be formatted such that fulfillment of the request involves the performance of at least one data storage operation and therefore transmission of a storage operation command such as described herein. A cryptographic key may be accessed for verifying a digital signature of the received request. Accessing the cryptographic key may be performed in various ways in accordance with various embodiments. For example, in some embodiments one or more features of the request are used to select a suitable cryptographic key from a plurality of cryptographic keys. An identity of an entity that submitted the request may be associated with the cryptographic key that is usable to verify digital signatures submitted by that identity. As another example, the request may include an identifier of a cryptographic key that enables selection of a suitable cryptographic key based in part on the identifier included in the request. Generally, any way by which a suitable cryptographic key usable for verifying the request is determinable may be used.

After accessing the cryptographic key, a determination can be made as to whether the digital signature is valid. In some embodiments, the cryptographic key is a symmetric cryptographic key and determining whether the digital signature is valid may include generating a reference digital signature of the request (or portion thereof) and determining whether the reference signature matches the digital signature that was received with the request. If it is determined that the signature is not valid, the request may be denied. The request may be denied in various ways in accordance with various embodiments. For example, in some embodiments denying the request includes providing a response to the request that indicates that the request is denied and/or indicates one or more reasons for its denial. Other ways by which a request may be denied may involve performing no additional operations in connection with the request. Generally denying the request may include any suitable way of avoiding fulfillment of the request.

If, however, it is determined that the signature is valid, an appropriate signing key can be accessed. In one embodiment, a signing key is a cryptographic key usable to digitally sign a storage operation command to enable submission of the storage operation command along with the digital signature such that the digital signature can be successfully verified upon receipt and the storage operation command will, as a result, be fulfilled. The signing key that is accessed may vary in accordance with various embodiments. In some examples, the signing key is the same cryptographic key used to verify the digital signature of the request. In other examples, the signing key is a key derived (such as in accordance with various techniques described herein) based at least in part on the cryptographic key used for verifying the digital signature of the request. In yet another example, the signing key may be a cryptographic key from which the cryptographic key used for verifying the digital signature of the request is derived. In yet another example, neither the signing key nor the cryptographic key used for verifying the digital signature of the request is derived from the other. It should be noted that in embodiments where the cryptographic key used for verifying the digital signature of the request and the signing key are the same, the operation of accessing the signing key may have already been performed and thus may be considered to not be a separate operation.

Regardless of how the signing key is accessed, a storage operation command can be generated. In one embodiment, the storage operation command is a command to perform a data storage operation that matches the request that was received. For example, an application programming interface (API) may be able to receive any of a variety of API calls that may be made to effect data storage operations. The various types of API calls that can be made may correspond to types of storage operation commands that are transmitted as part of fulfillment of the API calls. Further, generating a storage operation command may include populating a template for a command with data which may be data received in the request. As an illustrative example, if the request is an API request to store data, the storage operation command may include or otherwise specify the data to be stored that was included in the request. Once the storage operation command has been generated, the storage operation command can be digitally signed, which as discussed above may include using the accessed signing key to generate a digital signature based, at least in part, on the generated storage operation command. Once the storage operation command has been digitally signed, the storage operation command and the digital signature that was generated can be transmitted to data storage, such as at least one compute-enabled storage device as discussed herein, where at least one compute-enabled storage device can be configured to verify the digital signature using its own copy of the signing key (which it may have to derive, in some embodiments) and, upon verification of the digital signature, fulfill the storage operation command.

In this process a storage command is transmitted as a result of a received API request being fulfilled. Storage commands may be transmitted in other ways as well. For example, in some embodiments a system that receives API requests is operable to fulfill the API requests by performing log operations where the log operations are transmitted at a later time to another system that processes a log in order to persistently store data in accordance with the operations that were performed. The coalescing can be performed in an environment that utilized a log structure and/or log-structured file systems, wherein updates are provided through a series of log entries and a current state of the data is determined by examining the logs. Log coalescing can result in multiple operations for a piece of data being condensed into a single log, whereby the state of that piece of data can be determined from a single log instead of all logs previously affecting that piece of data, etc. A system that receives API requests may, for instance, utilize in a memory copy of a database to provide low latency access to the database through, for example, appropriately configured database queries. Thus, the system may provide quick performance of fulfillment of API requests by utilizing the in-memory copy of the database. To maintain the persistently stored copy of the database, another system may maintain the copy of the database in persistent storage. The system with the in-memory copy of the database may transmit logs of the operations that were performed which may then be processed by the system with the persistently stored copy of the database in order to update the persistently stored copy of the database asynchronously with the API requests that were received.

A data storage command may be configured in accordance with a data storage command protocol, which may be a structured query language (SQL) command, a binary input/output (I/O) protocol, a block-level storage operation command or otherwise. Other examples include the small computer system interface (SCSI) and serial ATA. Variations of such protocols may also be used, such as Internet SCSI (iSCSI) and SCSI over Fiber Channel. The data storage command may be transmitted over another protocol, such as by encoding the command in a data packet transmitted over a network. For example, the command may be encoded in a TCP/IP packet or Fiber Channel (FC) packet. While examples of specific protocols are provided for the purpose of illustration, the techniques described herein are extendible to other protocols including, but not limited to, proprietary protocols. Further, such a binary I/O protocol used with the techniques described herein may include the ability to encode policy (to be enforced by a signature verifying entity, for example), bearer tokens, cookies, cryptographic key identifiers, and/or other metadata. Generally, a storage operation command (also referred to as a data storage operation command) may be any digital encoding of a command and associated metadata that is receivable by a data storage system to cause the data storage system to fulfill the command (in accordance with the metadata, if applicable). Further, storage operation commands may be transmitted in plaintext (i.e., unencrypted) for to avoid latency caused by the need to perform encryption/decryption operations.

In at least some embodiments, data storage can comprise at least one data storage device, such as a solid state drive (SSD) or Serial ATA (SATA) drive. In at least some embodiments, the storage device can operate between 1.0 volts and 5.0 volts, or at least under 5.0 volts in other embodiments. An example storage device can include between 10 and 30 pins and at least one serial port, among other such options. Such a device can have processing or "computing" capacity onboard that enables the device to perform actions such as may involve the authenticating of commands. These commands might be associated with various systems, devices, components, or entities, such as software guide extensions (SGX) enclaves, hypervisor guests, or customers of a provider, among others. Such a "compute-enabled" storage device can receive a digitally signed storage operation command, for example, and authenticate the command using the appropriate key stored in the device. In at least some embodiments a storage device with processing capability has mostly solid state memory, such as where at least a majority of the non-transitory computer-readable storage medium is flash memory or similar material. In other embodiments the computer-readable storage medium can include a majority of rotatable medium memory, such as hard disks and optical disks, among others. The storage device can be accessible via standard storage protocols, and in at least some embodiments can comprise a block-addressable storage device.

Further, such a device can include hardware that enables the device to function as a hardware security module. This can include dedicated cryptographic hardware, such as a cryptographic card with processing capability inserted into a storage device, the hardware can also include one or more general purpose CPUs, such as an Advanced RISC Machines (ARM) core, that can have access to instructions for performing cryptographic functionality. In some instances, the cryptographic functionality can be provided using firmware that can cause a general purpose CPU or other such processor to perform the necessary cryptographic calculations and other such tasks. A conventional hardware security module (HSM) is a physical device or component that is able securely store and manage cryptographic keys, as well as to perform cryptographic processing tasks. While conventional hardware security modules can take the form of dedicated hardware devices, cards, or dongles as discussed above, for example, the ability to include processing capacity and cryptographic processing capability in a storage device, such as a SATA disk, enables that storage device to also function as a storage node, as well as being able to perform tasks as a processing node in the network. In at least some embodiments the cryptographic hardware can utilize a public-key cryptography standard (PKCS) #11 interface (a cryptographic token interface), or other such interface. A PKCS #11 interface can take the form of an API defining a generic interface to cryptographic tokens, such as for a Hardware Security Module, useful for tasks such as public-key cryptography and single sign-on.

The ability to turn a storage device into an hardware security module, such as by providing the appropriate firmware in some embodiments, helps to provide for secure execution environments where those environments have access to their own storage and keys that are not exported outside of the respective environment. The storage device can receive a command, perform one or more calculations on data encrypted using a secure key inside the device, and then return a result, which can be encrypted with the internal key or an external key, of which the intended recipient has a copy. The ability to use a device such as a SATA disk or SSD as a local cache with computing capability can also provide for lower latency operations using keys than in traditional networks where servers might obtain keys from a key management service or other such location. Conventional approaches were based on the fact that it was easier to move the data storage to the processing, but it is becoming increasingly advantageous to move the processing to the data storage, particularly as SSDs are able to store tens of gigabytes of data or more. Further, milliseconds of latency are becoming increasingly important, such that reducing the latency even fractionally can make a significant impact. Even the number of buses, serializers, and deserializers can make an impact in some systems. By placing processing capacity in the storage device itself, and providing cryptographic capability, the built-in, embedded machine can operate as a storage server, such as may be used in the cloud or as part of a storage cluster.

In some embodiments, a storage device such as a disk drive can perform cryptographic operations that might be completely unrelated to data stored on that drive. For example, the drive can store one or more cryptographic keys that are not exposed outside the drive. The drive can perform the operation using the key(s), as necessary, and then return the result of the operations. In some embodiments the data to be processed as part of the operation can be passed in with the request. The device would also be generally inaccessible to all other code on a machine hosting the drive, in at least some embodiments.

Figure 2A:
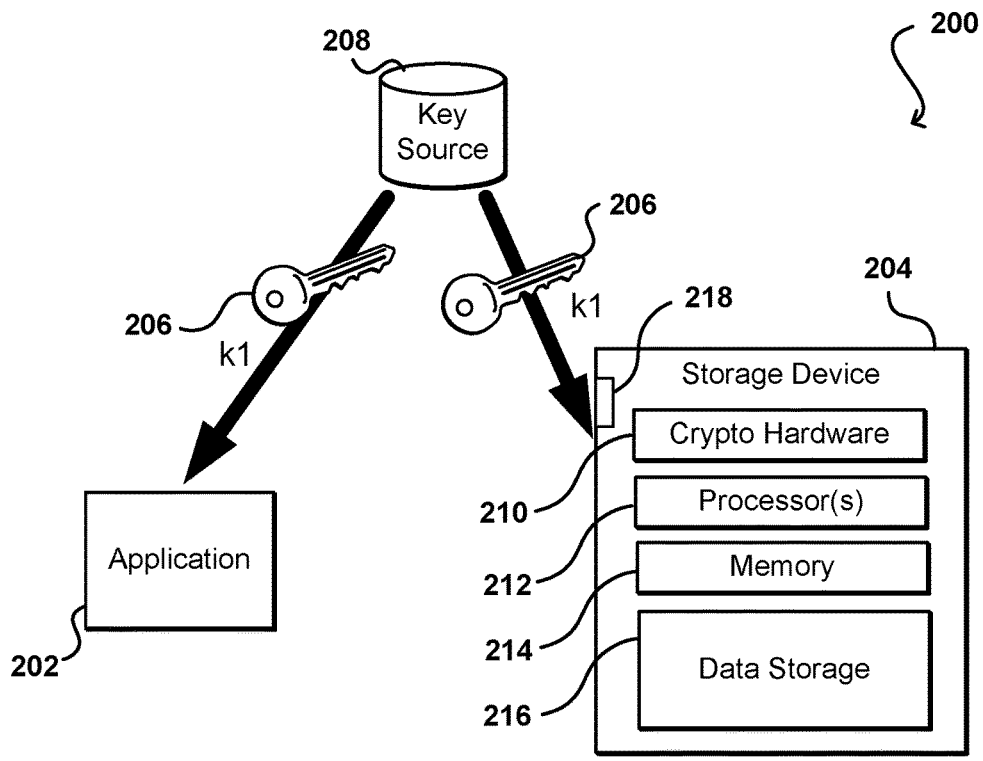
FIGS. 2(a) and 2(b) show an example of an environment in which internal keys can be provided for use between an application and a storage device in accordance with various embodiments.

FIG. 2(a) illustrates an example environment 200 in which various embodiments can be implemented. This example environment 200 includes an application 202, which can execute on a client device or computing system, and storage device 204, such as a solid state drive (SSD), hard disk, SATA disk, and the like. The application 202 can be operable to generate, transmit, and receive input/output commands, data read and write requests, and other such communications. In some embodiments, the application can correspond to a process executing in a guest in a hypervisor provided in a multi-tenant environment by a multi-tenant service provider. The application can issue storage operation commands to be performed by another system, service, or component. These commands can be issued over a network, such as in the form of a series of data packets, but can also be transmitted over other mechanisms such as a storage bus that utilizes an embedded storage protocol. The storage device 204 can be part of a data storage system or service, such as may be part of a shared or multi-tenant resource environment. The storage device can be enabled to perform various operations in response to commands from the application 202, among other such sources, where the commands can relate to, for example, the persistent storage of data.

In some embodiments the storage device is part of a backend system of a database service. The backend system can include one or more hard drives with spinning magnetic media and/or solid state media, which can persistently store data. While devices that persistently store data are used throughout for the purpose of illustration, the techniques described herein are useable in connection with other data storage systems that do not necessarily persistently store data such as data storage systems that maintain data in volatile memory without persistently storing the data. A data storage service can include one or more data storage devices which can each store data for one or more customers or users, and may partitioned as known for such purposes. For devices with processing capability as discussed herein, a device may be able to partition itself and/or other storage devices. Such a service can also include one or more data storage controllers, which can be internal or external to any of the physical storage devices, and in at least some embodiments each physical data storage device can have its own data storage controller.

In this example, the data storage device includes at least one non-transitory computer-readable storage medium, such as flash memory or a hard disk, among other such options, which functions as data storage 216 for the storage device 204. The storage device also includes at least one processor 212 capable of executing instructions, as may be stored in other computer-readable storage media, such as flash memory 214, in the storage device. As known for memory and data storage, a device may have dedicated memory for instructions and separate memory for storing customer data, for example, while in other embodiments a single type of memory may be used, etc. In at least some embodiments, the data storage device 204 can store instructions for performing various operations on data stored in the data storage 216, as may include data transformation, de-duplication, application of a delta to a data set, or compression operations, among others. For the application of a delta, this can include the generation of a DIFF instruction, whereby the device can apply the DIFF to the specified data set, which can be stored on the device or provided with the instruction, among other such options.

Data can be compressed before it is written to storage in order to conserve storage capacity on the device and reduce write amplification as may be associated with garbage collection and overwrites. As mentioned, the processor(s) of the storage device can also be configured to perform operations that may not involve any data stored in the local data storage 216. There can also be at least one data port 218, such as a SATA port, on the storage device for transferring data to, and from, the device.

The storage device 204 also includes cryptographic hardware 210, such as a smart card, cryptanalytic device, dedicated circuitry and components, or other such elements that enable the storage device 204 to generate, store, rotate, and/or otherwise manage cryptographic keys, or other such credentials, for use in performing various operations using the storage device 204. For example, a request might be received with a key that is to be used to decrypt data for use in processing a command associated with the request. That key also might include an embedded key, which is to be maintained by the cryptographic hardware inside the storage device and not exported outside the device, as discussed elsewhere herein. In some embodiments, a designated portion of the flash memory can be dedicated as a cache for the purposes of storing the appropriate encryption keys.

As mentioned, an application 202 (or other storage command initiator) might want to cause data to be stored in the storage device 204 in an encrypted form, where the encryption is performed using a key that is not exposed to components sitting along a path between the application and the storage device. In order to accomplish this, the application 202 can request and/or receive a first "external" cryptographic key from an appropriate key source 208, such as a key management service, although in other embodiments an application or client device can generate its own keys for such purposes. The key source 208 can cause a copy of the external key 206 to be sent to the storage device 204 as well. It should be understood, however, that the keys can be distributed in other ways as well. For example, the external key 206 might be generated by the application 202 and/or the storage device might receive its copy of the external key 206 from the application 202, among other such options.

Figure 2B:
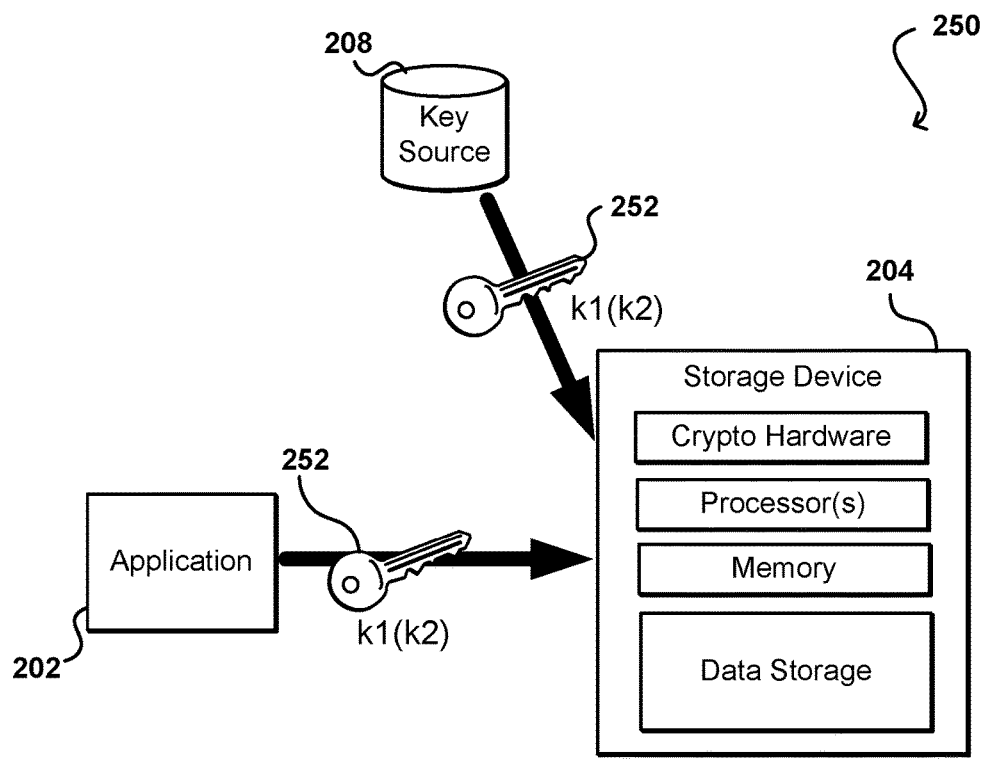

While providing the storage device with a copy of an external key may be sufficient for some situations, in others it might be desirable to utilize a more secure approach. Accordingly, the example environment 250 in FIG. 2(b) shows that a second, "internal" key can be provided to the storage device 204 for use in operations associated with the application 202. In this example, the internal key can be provided by the application 202 or the key source 208, although in some embodiments the storage device 204 could generate the internal key and send a copy to the application 202. In order to prevent the internal key from being exposed to external entities, however, the internal key (k2 in the figure) can be encrypted using the first, external key (k1 in the figure). In this way, the application or key source can send the internal key to the storage device 204 in such a way that a party or component intercepting the internal key could only obtain the internal key if also having a copy of the external key. In some embodiments the internal key, encrypted using the external key, can be provided by an HSM (not shown), and can cause the internal key to be decrypted (inside the storage device 204) using the external key for use by the cryptographic hardware of the storage device 204.

The internal and/or external cryptographic key may be, for example, a symmetric or asymmetric cryptographic key useful for the performance of various cryptographic algorithms. Examples of cryptographic algorithms include those discussed elsewhere herein, such as may include modes (e.g., XTS) of the advanced encryption standard (AES), the data encryption standard (DES), triple DES (3DES), Serpent, Twofish, blowfish, CAST5, RC4 and the international data encryption algorithm (IDEA), among others. The key source 208 may be a system that manages keys on behalf of one or more entities. For example, the key source may be a computer system that securely stores cryptographic keys, providing copies of the cryptographic keys only to entities authorized to receive such copies. The key source 208 may itself receive cryptographic keys from another key source. As keys are passed from one entity to another, the keys may be scoped so that a first system with access to a first key uses the first key to derive a second key that is passed onto a second system.

In some embodiments, receipt of a cryptographic key associated with a customer of the provider enables the application 202 to digitally sign storage commands using the cryptographic key. The key used to sign a command can be different than a key used to encrypt data to be processed by the storage device. If the application receives requests from a client device and submits storage commands on behalf of the customer, the cryptographic key can be usable by the application 202 to verify requests submitted by, or on behalf of, the customer prior to digitally signing storage commands as part of fulfillment of the requests. In some other embodiments, the key source 208 may be an authentication subsystem of a computing resource service provider.

Figure 3A:
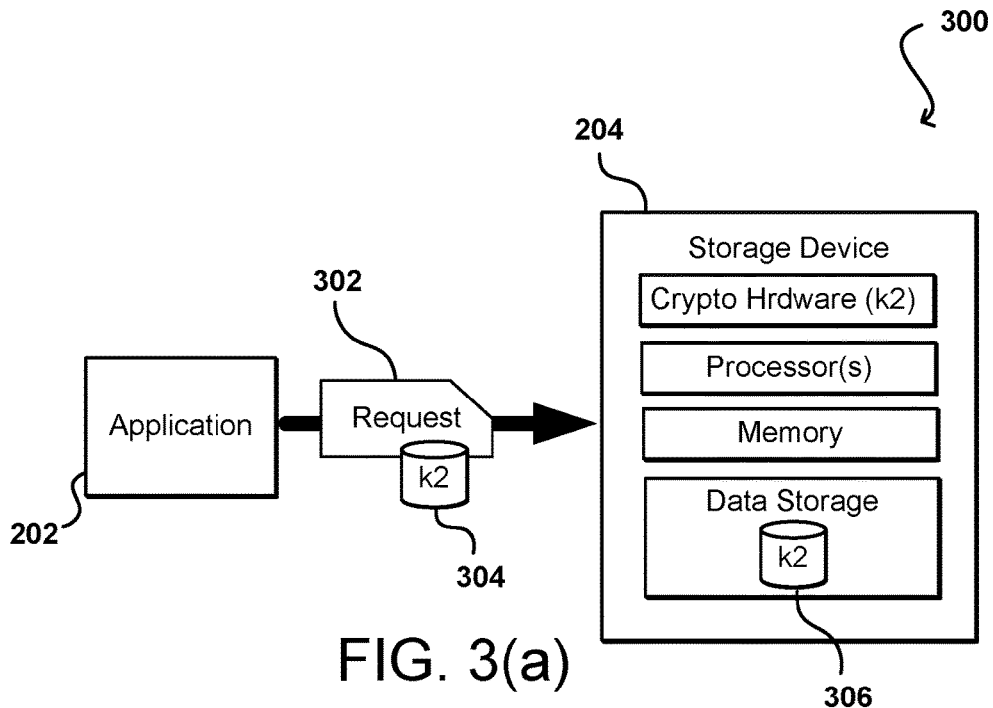
FIGS. 3(a) and 3(b) illustrate an example of an environment in which an operation can be performed on encrypted data within a storage device, and the result returned, which can be utilized in accordance with various embodiments.

Once the application 202 and the client each have a copy of the internal key k2, the application can send a request 302 to be processed by the storage device 204, as illustrated in the example situation 300 of FIG. 3(a), where the data is encrypted under the internal key. It should be understood that reference numbers may be carried over between figures for similar elements for purposes of simplicity and ease of understanding, but such usage should not be interpreted as a limitation on the scope of the various embodiments unless otherwise stated herein. In some embodiments, however, the internal key (encrypted under the external key) may be sent along with the encrypted data 304 in the request 302, or no encrypted data might be sent with the request 302, among other such options. The request 302 can also include a digital signature in some embodiments, which can be generated using external key k1 or another such key or credential. In other embodiments, other credentials might be provided to enable authentication of the source of the request. These credentials can include any appropriate credentials, such as passwords, retinal scans, fingerprint data, and the like.

The request 302 can be received to the storage device 204, which can authenticate the source of the request in some embodiments, such as by validating a digital signature or other such credential as discussed elsewhere herein. If the source of the request is authenticated or the request 302 is otherwise able to be processed by the storage device 204, the storage device can determine whether an internal key is needed to process the request, as well as whether the device has a copy of the key or a copy was received with the request 302. If a copy was received with the request, but is encrypted under an external key, then the device can determine the external key (requesting from the key source if necessary) and decrypt the internal key for use in processing the request. In some embodiments, the request can include the internal key and a command for the device to act as an HSM for the customer using the designated internal key.

In other embodiments, the request 302 might include a command to perform an operation with respect to the data stored for the customer on the device, at a location specified by the request, and/or received with the request, which might be encrypted using the internal key. The command can correspond to any appropriate instruction, such as to sort data, sum data, search against a specified predicate, coalesce a set of logs (including semantic interpretation), and the like. If the customer associated with the request is authorized (or otherwise has permission) to have the operation performed on the data, and the storage device has the appropriate internal key for the operation, the storage device can cause the operation to be performed on the corresponding data. In some embodiments the request can include a set of data and an instruction to perform an operation such as to decrypt the data and return the data to the source of the request (or another specified destination) without reading or storing any of the data outside the secure HSM portion of the device. In such an instance, the request may not include or specify an address (e.g., an LBA block address) on the storage device itself.

Figure 3B:
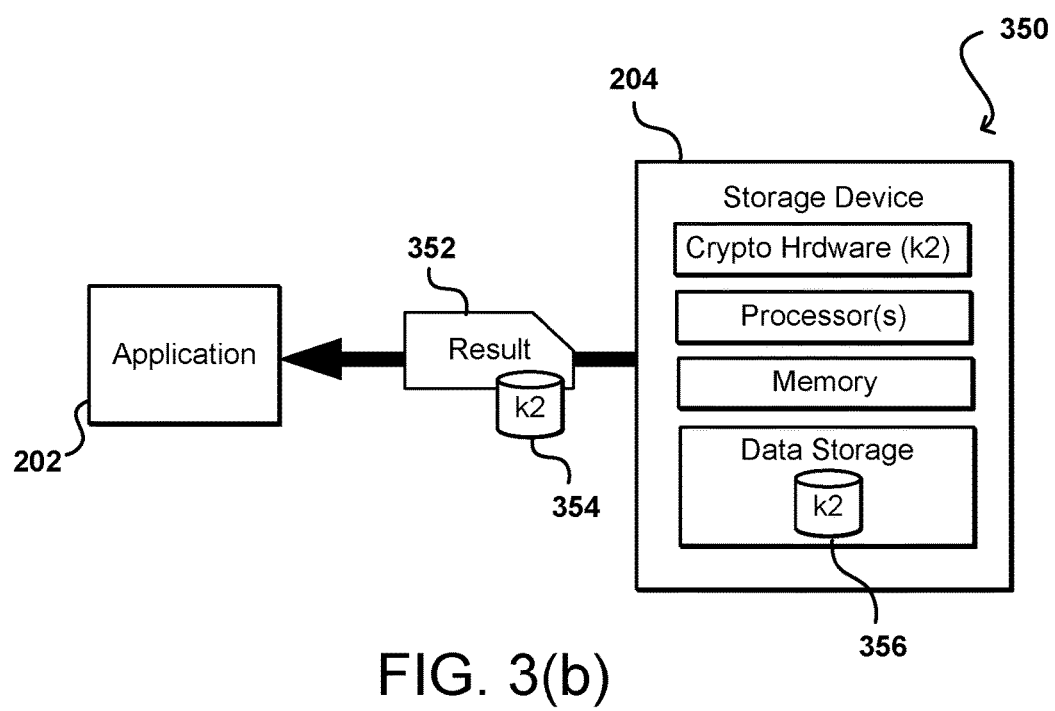

As illustrated in the example environment 350 of FIG. 3(b), the result 352 of the operation can then be returned to the application 202 and/or delivered to another appropriate destination or recipient. The result can take many forms, such as a plaintext result that does not include any of the data, a result of the operation that may not include any of the data but is encrypted using the appropriate key, or a result that may include some of the data encrypted under the appropriate key. Various other results can be returned as well within the scope of the various embodiments.

In one example, an instruction might involve using an internal key only for a length of time necessary for an operation and then discarding the key. For example, an instruction might indicate that a device is to coalesce a set of logs. In order to perform the coalescing, the storage device can determine the key (as may involve decrypting it using an external key as discussed) and decrypt each log as necessary to analyze the contents of the log. The instructions can indicate specific limitations, such as the requirement that the device not provide any ciphertext of the log data outside the drive but instead only operate in the log coalescing mode to optimize the ciphertext stored by the device. When the coalescing is complete and the logs are encrypted again under the appropriate internal key, the internal key can be discarded in at least some embodiments such that the plaintext is not available unless the appropriate key is subsequently received from the customer (or another such source).

Figure 4:
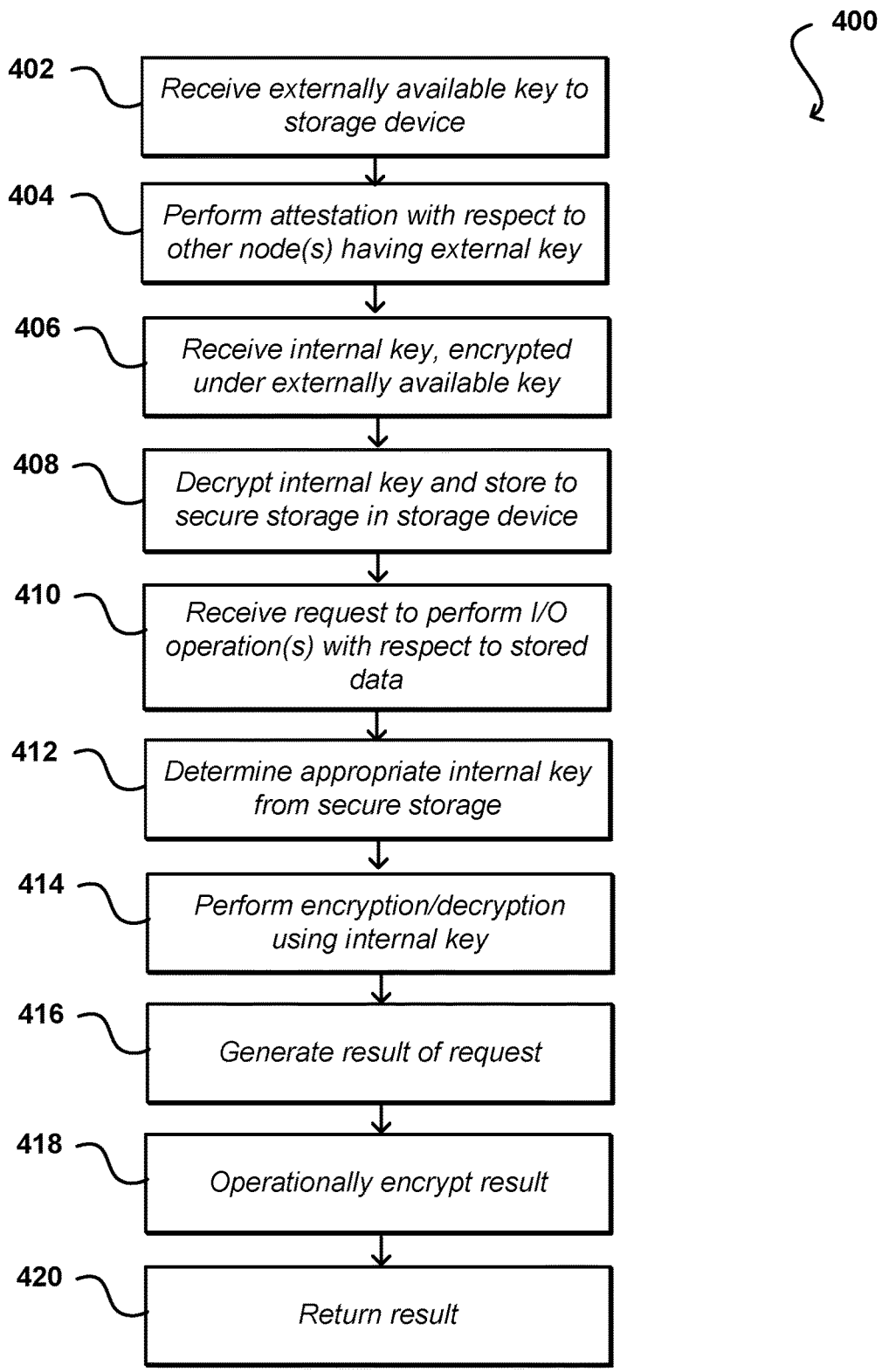
FIG. 4 illustrates an example process for enabling a storage device to function as a hardware security module that can be utilized in accordance with various embodiments.

FIG. 4 illustrates an example process 400 for utilizing a storage device as a hardware security model that can be utilized in accordance with various embodiments. It should be understood for this and other processes discussed herein that there can be additional, alternative, or fewer steps performed in similar or alternative orders, or in parallel, within the scope of the various embodiments unless otherwise stated. In this example, an externally available key is received 402 to a storage device, as may reside in a cluster of devices or a resource provider environment, among other such options. As mentioned, the key may be received from a key source, key management service, a client device, an application, etc. In at least some embodiments, some level of attestation is performed 404 with respect to other nodes having a copy of the external key, such as an application or client device from which the key is received. Various approaches can be used for attestation, as discussed elsewhere herein and as known in the art, in order to cryptographically prove that the key in a request is protected by a trusted source. In some embodiments an attestation and/or authentication process can include a hypervisor authenticating a specific domain to a storage device and allowing the storage device to determine the origin of the operations, which in some embodiments can also allow virtualization to be moved down to the storage device. The copy of the external key can then be stored by the device, such as in a memory space that is used to hold copies of external keys in the storage device. In some embodiments there can be a "public" external key associated with a device, a certificate attesting to the fact that the public key is placed into the device in a way such that it will not leave. The device can then sign transmissions using that key, and the same or a different key can be used for key agreement or key transfer, such that material can be produced that will allow a key to be recovered in the device but not by the system handing the key to the device. There can be a separate key agreement key from the authentication key, which can be established from the factory or setup during initialization.

Subsequently, an "internal" key can be received 406 that is encrypted using the external key. The internal key can be received from the client or application for which data is to be stored, among other such sources. In some embodiments, an internal key can alternatively be generated within the storage device or placed into the storage device prior to installation or customer software access, among other such options. For example, an internal key may be accepted if it is encrypted to a key or certificate associated with a corresponding customer. An internal key may also be accepted if it is signed and/or encrypted by a certificate from a third-party associated with the customer. In some embodiments, a customer can have access to the device, whether through a separate mode of operation or otherwise, wherein the customer can provide (or otherwise specify) the key before the device is provisioned to the customer (and potentially other customers) and thus before any customer software has access to the device. In cases where a second mode of operation (herein referred to as a key provisioning mode) is used, access to other portions of the device, stored keys, data, or instructions can be prevented, and in some cases any keys previously stored on the device can be deleted or otherwise destroyed. Once the device is out of the provisioning mode and back in an operational mode, for example, the device will not, in at least some embodiments, be able to receive new internal keys to the HSM portion, unless again placed in the key provisioning mode. As used herein, the "operational" mode refers to a mode of standard operation, where the device is performing its intended function(s), such as may include I/O operations or conventional cryptographic functions, among other such options.

The key may also be recoverable using other information received to the storage device in some embodiments. The internal key can be decrypted 408, using the locally stored copy of the external key, and stored securely in the storage device, such as in secure cryptographic storage that is inaccessible to other guests, partitions, or requests in, or received to, the storage device. Keys stored to the secure storage may be associated with a particular user, application, or entity, for example, and other keys stored in secure storage for other entities may not be visible to that user. Subsequently, a request can be received 410 to perform an input and/or output (I/O) operation with respect to the stored data. This may also include data received with the request in some embodiments. The operations can include HSM read and write operations as known or used in the art. Information for the request can be analyzed to determine 412 the appropriate internal key, from secure storage, to be used for the operation. Appropriate encryption and/or decryption can then be performed 414 using the appropriate internal key. The result of the operation can be generated 416, and in at least some embodiments or situations the result can be encrypted 418. Thus, the final result can take the form of plaintext or ciphertext generated under a specified key, and the result returned 420 or otherwise transmitted to the appropriate destination or recipient. For read operations the result might be the data in plaintext or encrypted under the internal or external key, and for write operations the result might be a notification indicating a successful write, as may include encrypting the data using the internal key before storing. In some embodiments the storage device may be manufactured with such capability, while in other embodiments firmware or another such mechanism can be used to transform a standard storage device, such as an SSD or SATA disk, into such a device.

Thus, a storage device can be utilized as an HSM that can manage keys for multiple users or entities and perform corresponding operations, such as to encrypt or decrypt data using an appropriate key, or perform various key management operations. For storage devices that have processing capability, however, additional tasks or operations can be performed by the device as well. For example, an SSD can perform operations on encrypted data that is stored in the attached or incorporated flash memory. For example, a request can cause the storage device to decrypt the data as needed using a specified key, and attempt to locate a specified key in the plain text when decrypted. The key can be key is encrypted to a key held within the HSM, and as such can be transferred to the disk through the system without the system obtaining access to the plaintext. In some embodiments, the wrapping of the key can specify the intended purpose such that the storage device can know to use the key for the respective task and then discard the key without exposing any of the other data on the device. If the storage device stores a significant amount of encrypted data, a key encrypted to a key held within the disk could be packaged, where the key is usable to decrypt the stored information or a subset thereof, and is packaged with instructions as to the task(s) for which the key should be used. This can include, for example, use this key to decrypt the appropriate data and it is acceptable to reveal up to 100 bytes of matching encrypted data. The command can direct the device to use the key to decrypt data in a specified range and return that data encrypted to a specified key, which may be different from the key used to initially encrypt the data. A command also can indicate to use the key to coalesce data for various update logs, as discussed elsewhere herein. The ability to periodically receive keying material usable to decrypt, coalesce, and re-encrypt data, with the storage device configured not to reveal anything that was encrypted under the key, can provide for efficient incremental updates to encrypted data stored on the device, with coalescing able to be performed on the back end. Deduplication can be performed as well, where there may be several files that are potentially encrypted using randomized encryption such it can be difficult to determine whether two files are the same on a given storage device. Keying material may be passed to the storage device in order for the device to determine whether any files are the same, then eliminate the duplication and re-link or re-map the storage. The physical locations where data is stored can be tied to a particular operator identity but the mappings not determinable by analyzing the raw flash. The data is only determinable once the device has used the keying material to gain access. Further, in at least some embodiments the plaintext is never transmitted outside the storage device although the result of operations performed using that data may be transmitted, at least under certain circumstances.

Figure 5:
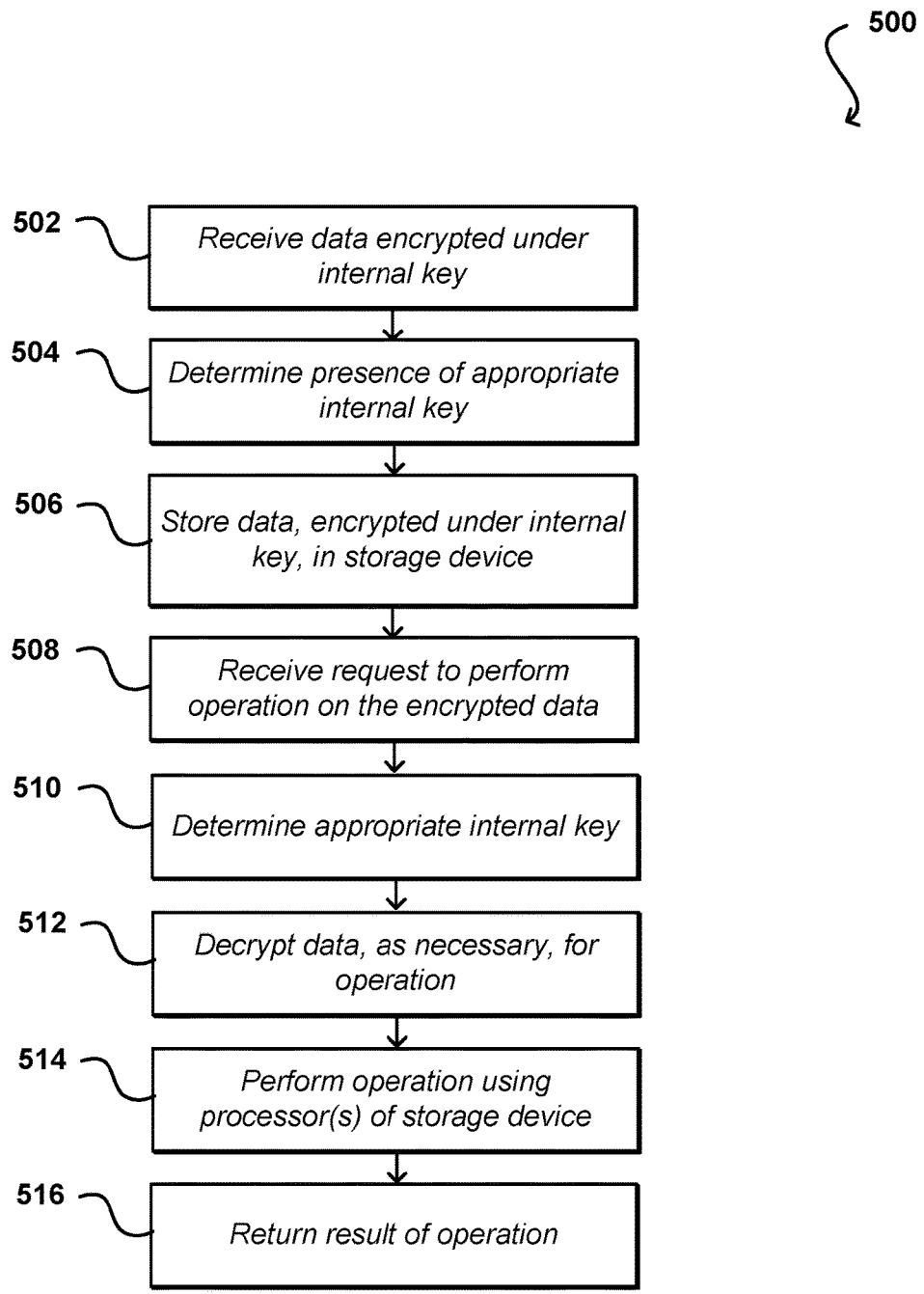
FIG. 5 illustrates an example process for enabling a storage device to perform cryptographic processing that can be utilized in accordance with various embodiments.

FIG. 5 illustrates another example process 500 that can be used to process operations, including one or more cryptographic tasks, that can be utilized in accordance with various embodiments. As in the previous example, data is received 502 to a storage device, where that data is encrypted under an internal key. The presence of the appropriate internal key can be determined 504, such as by determining a set of keys associated with an identity or by extracting and decrypting the key from the data storage request. The data can then be stored 506 in the storage device, encrypted under the internal key. If the data was encrypted under an external key when received, that data can be decrypted using the external key and re-encrypted using the appropriate internal key.

Subsequently, a request can be received 508 with respect to an operation to be performed using the stored data. The appropriate internal key for performing the request can be determined 510, such as by determining the appropriate key from secure storage or using keying material received with the request, among other such options. If there are restrictions on the use of the key, a determination can also be made as to whether the operation for the request is able to be performed using the key. If the key is obtained and able to be used for the operation, the data can be decrypted 512, as needed, to perform the operation. In at least some embodiments, the data will remain encrypted while stored, and if the data is changed during the operation then the data can be re-encrypted, or encrypted a first time, and stored to the storage device. The operation on the decrypted data can be performed 514, and the result of the operation returned 516. As discussed, the result can include ciphertext, only the result of the operation, up to an amount of ciphertext, or any other appropriate result. In some embodiments, a series of commands can be performed using the key, after which time the copy of the key in the storage device is to be destroyed. In other embodiments, the key might be kept indefinitely (absent rotation, etc.) for purposes such as record coalescing and de-duplication, among other such tasks. In many embodiments, any data returned with the result or response will be encrypted with the internal key that is not available to other nodes or front-ends of the system, such that the ciphertext will be unable to be encrypted elsewhere in the system. Such an approach enables portions of a query engine (or other application) to effectively be distributed over one or more storage devices, enabling fulfillment of certain operations over encrypted data using a key not available to any of the pieces in the path. For example, a query can cause records stored in multiple devices to be analyzed to locate all records satisfying one or more search criteria, such as a predicate evaluating to "true." In some embodiments a storage device may require that the predicate be signed using a public key or using a MAC key that is associated with the encryption key on the in the storage device, such as to prevent arbitrary queries from being processed that were not submitted by the appropriate client. Such an approach also enables other operations as well, such as generic filtering and aggregation, data replacement, file patching using encrypted data, and the like.

Figure 6:
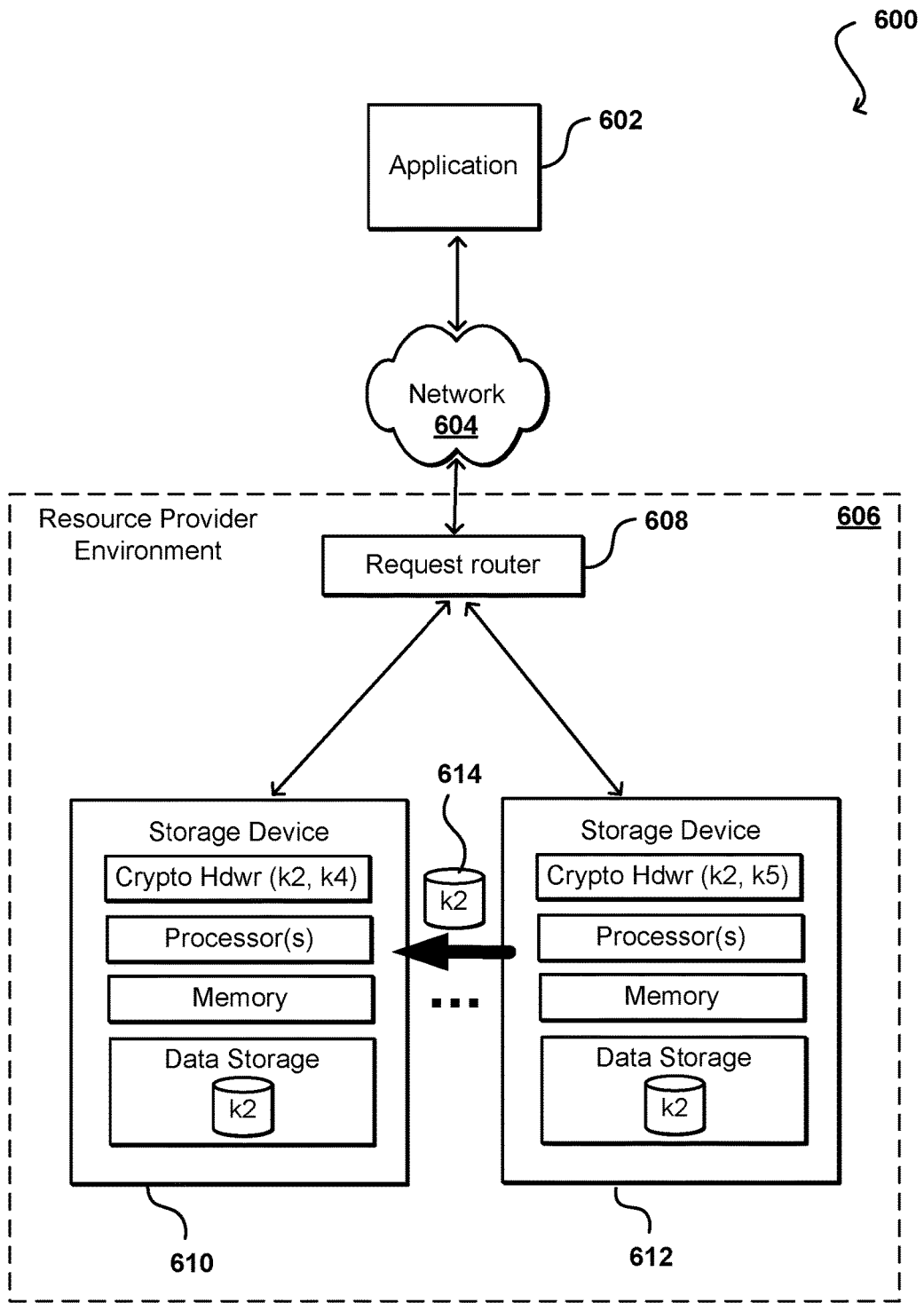
FIG. 6 illustrates an example environment wherein storage devices can perform distributed cryptographic processing that can be utilized in accordance with various embodiments.

In at least some situations, an operation to be performed using a specified key can include portions to be performed against each of a set of storage devices in a distributed environment, such as is illustrated in the example environment 600 of FIG. 6. In this example, an application 602 is again able to submit requests across one or more networks 604 to a resource provider environment 606, or other such distributed, resource, and/or multi-tenant environment. The request can be received at a request router 608, which can be a component, layer, or service, for example, which can determine the appropriate storage devices 610, 612 for the request. If the request is to write data or perform an operation not tied to a specific device, an appropriate routing, load balancing, or distributing approach may be used, such as a round robin or other scheduling algorithm. If processing the request requires data stored on one or more of the storage devices, or a key stored on one or more of the storage devices, the request router can determine the appropriate devices and route the request accordingly. In some embodiments, partitions of certain devices might also be set aside for operations requested by, or otherwise associated with, certain users or entities, etc.

In this example, the storage devices 610, 612 can be intelligent devices with cryptographic capabilities, as discussed elsewhere herein, as may include processors, memory, cryptographic hardware, and the like. Further, each of these devices can be configured, through firmware or otherwise, to function at least in part like a hardware security module. When receiving information for an operation from the request router, a storage device can perform processes as discussed above, including determining the appropriate key, decrypting data, as needed, performing the operation, encrypting the data for storage, and/or deleting the key when finished. As above, the request might be tagged with and/or each respective storage device might already have the keying material that allows it to perform operations necessary for the fulfillment of the request. Upon completion, each device might return the result of its portion of the operation, such as the sum of the appropriate entries in its storage. The results can then be combined from the various devices without exposing any of the keys or plaintext, or potentially even ciphertext of the actual data, outside of any of the devices. In some embodiments, one of the storage devices can be designated a "master" node or device with respect to the operation, and cause portions of the work to be distributed across a set of storage devices, with the results being returned, aggregated or otherwise processed, then a final result generated at the master storage device.

For operations such as data transfer, replication, de-duplication, re-partitioning, and other such operations, the storage devices can also be configured to transfer data between the devices. For example, consider the situation where replication or re-partitioning causes data to be transferred from one storage device 612 to the other 610. In this case, the data can be encrypted under the appropriate key, and the encrypted data 614 transmitted to the appropriate device 610 for storage. Data might be transferred for any a number of other reasons, such as to present a result of a portion of an operation as discussed elsewhere herein. The data can also include keying material and the like. Each storage device can be configurable to support a plurality of callers, and portions of the physical storage on each device can be allocated among at least some of those callers. The read and write operations on the data can be isolated using the cryptographic capabilities of each device. Such devices still allow for tasks such as wear leveling and re-partitioning, however.

In at least some embodiments, one or more stream cipher algorithms can be used to generate new keys on demand, as well as intermediate keys used in the key upgrade process. A customer, manager, or other such entity can request that a key be upgraded, and a security manager, key manager, or other such component can cause the new and intermediate keys to be generated and sent to the appropriate locations where data stored under the old key is located. In other embodiments, keys can be scheduled to be rotated at regular intervals, or at other appropriate times, and the new and intermediate keys can be generated and pushed out automatically. In some embodiments, a security manager might receive a new key to be used, and generate an intermediate key to be distributed to the appropriate locations. The intermediate key then can be provided to any location having data stored under the old key, in order to cause the data to be encrypted under the new key.

In some embodiments upgrade keys can be used that match proper prefixes of the initial key, either randomly or in some sequence. Such an approach enables keys to be optimized out for improved security and/or processing. For example, if two 128 bit sub-keys in a 1,280 bit key are the same, those keys can be canceled out to arrive at a 1,024 bit key that does not include the redundant keys. An XOR cipher will cancel out any equal sub-keys or other such values. In some embodiments, keys can be used that are always twice the length of the previous, underlying generator key. In still other embodiments, the upgrade key can always be twice the size of the generator key, but half the size of the resulting new key. For example, the old key might be 128 bits in length, with the intermediate key being 256 bits that, when processed as discussed herein, results in a new key of 128 bits in length. The upgrade key can be the pairing of the old key and the new key, which does not provide robust security but does suffice to upgrade to the new key with efficient processing.

The ability to bootstrap an authentication key to a storage device also provides additional functionality not offered by conventional storage devices. For example, a special command or read to a particular location can be used to trigger a key exchange, where a key or key form can be used to create a data context on the device. Operations authenticated with the appropriate key could have a first level of access to that data context, and operations not authenticated with that key, or authenticated with a different key, can obtain a second level of access to that data context. Rather than requiring access to a key management system, each source of a storage operation can negotiate a key with the storage device, whereby the device itself can authenticate operations. The storage device then can be responsible for honoring only those operations authenticated with the negotiated key. Any number of keys can be utilized, but specific writes or commands must the tied to the appropriate key to be processed. In some embodiments, a key can be used to select a block map, whereby different users can negotiate different keys, read or write data at offset zero, and receive different virtualized views of the zero sector.

Various approaches can be used to obtain the key for such purposes. For example, a customer or guest can negotiate a key for virtual reads and writes. In some embodiments a derived MAC key can be provide that may be encrypted to a different key that is known to be available to the storage device. Public key certificates can also be used in various embodiments. A certificate might be signed by a third party saying that a storage device is validated, or there is a validated co-processor on the device, that will always enforce the determined properties, will never reveal the key, and will never reveal the result of the decryption but only the result of a subset operation. Various mechanisms can be used to provide authorizations as well. In some embodiments, a list or other collection of authorizations can be maintained that indicates which commands can be processed, or how those commands are to be processed, for different users or types of users. While some authorizations can be tied to specific keys, in other embodiments a fully flexible policy language might be used that could send requests to a key management service and can maintain a facility for receiving additional keys encrypted with a key that is burned into the storage device and not exportable.

Figure 7:
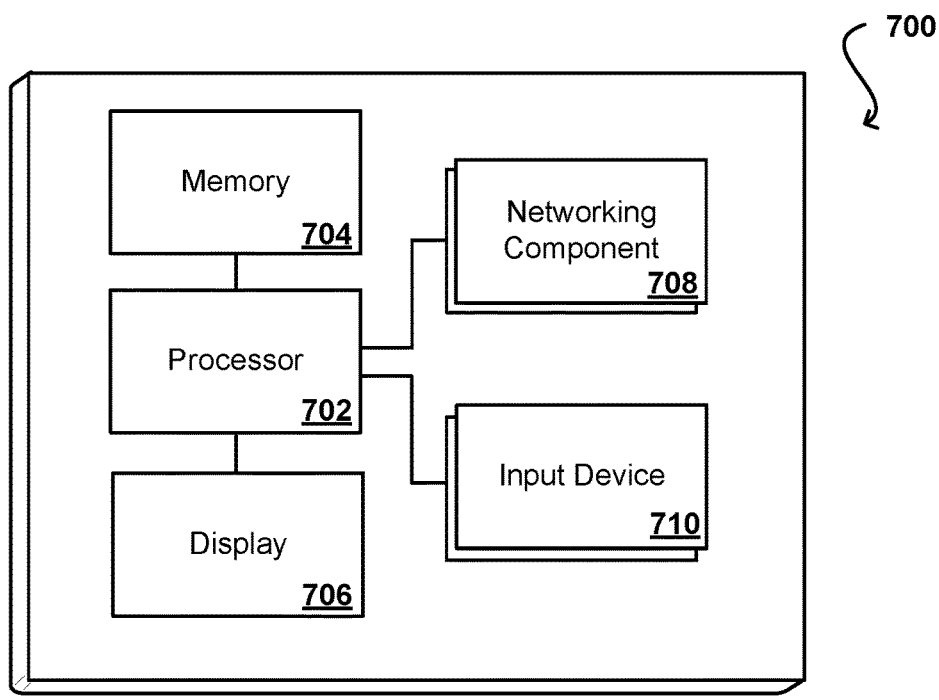
FIG. 7 illustrates example components of a computing device that can be used to implement aspects of various embodiments.

FIG. 7 illustrates a set of basic components of an example computing device 700 that can be utilized to implement aspects of the various embodiments. In this example, the device includes at least one processor 702 for executing instructions that can be stored in a memory device or element 704. As would be apparent to one of ordinary skill in the art, the device can include many types of memory, data storage or computer-readable media, such as a first data storage for program instructions for execution by the at least one processor 702, the same or separate storage can be used for images or data, a removable memory can be available for sharing information with other devices, and any number of communication approaches can be available for sharing with other devices. The device may include at least one type of display element 706, such as a touch screen, electronic ink (e-ink), organic light emitting diode (OLED) or liquid crystal display (LCD), although devices such as servers might convey information via other means, such as through a system of lights and data transmissions. The device typically will include one or more networking components 708, such as a port, network interface card, or wireless transceiver that enables communication over at least one network. The device can include at least one input device 710 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 8:
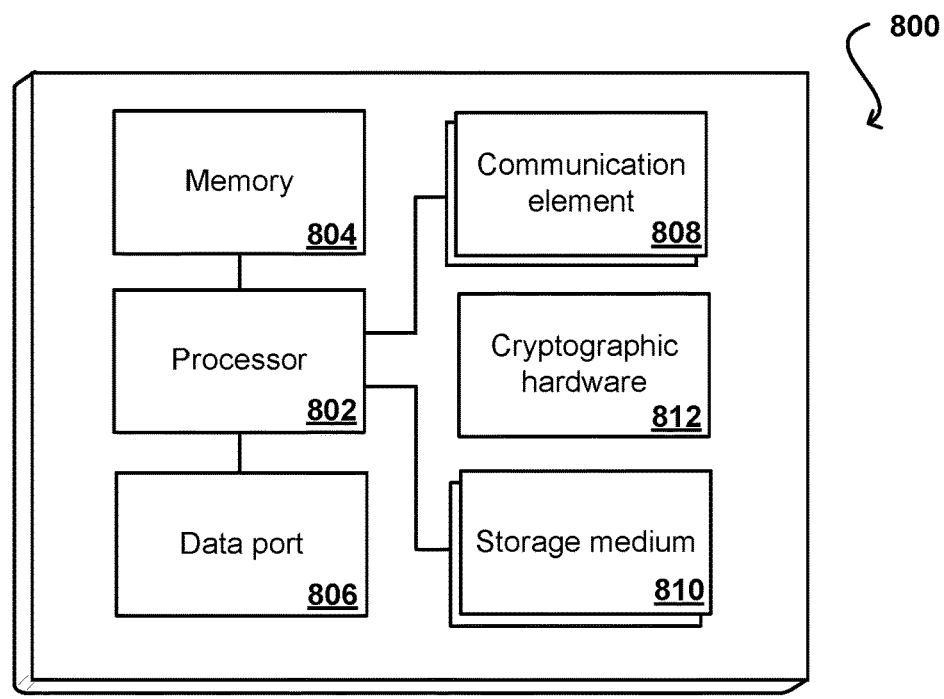
FIG. 8 illustrates example components of a storage device that can be used to implement aspects of various embodiments.

FIG. 8 illustrates a set of basic components of an example storage device 800 that can be utilized to implement aspects of the various embodiments. In this example, the device includes at least one processor 802 for executing instructions that can be stored in a memory device or element 1004. As would be apparent to one of ordinary skill in the art, the device can include many types of memory, data storage or computer-readable media, such as a first data storage for program instructions for execution by the at least one processor 1002, the same or separate storage can be used for images or data, a removable memory can be available for sharing information with other devices, and any number of communication approaches can be available for sharing with other devices. For a storage device the device can include one or more non-transitory computer-readable storage media 810, which can be used to store data for one or more users, entities, or other such data sources. The device typically will include one or more communication elements or components 808, such as network interface card or wireless transceiver that enables communication over at least one network. The device can also include at least one data port 806, such as a SATA port, for transferring data to, and from, the device. The device can also include cryptographic hardware 812 enabling the device to securely store keys and prevent users from accessing or viewing data or keys from other users, etc. The device can include at least one other input device able to receive conventional input from a user. This conventional input can include, for example, a push button, touch pad, touch screen, keypad or any other such device or element whereby a user can input a command to the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A storage device, comprising:
at least one non-transitory computer-readable storage medium for storing data;
at least one processor configured to perform cryptographic processing; and
memory including instructions that, when executed by the at least one processor, cause the storage device to:
operate in a key provisioning mode, during which access to at least a designated portion of the storage device is prevented while generating an internal key;
receive, at the storage device, data encrypted under the internal key;
determine, using the at least one processor, the internal key from a plurality of internal keys stored by the storage device; and
decrypt, in the storage device, at least a portion of the data using the internal key.

2. The storage device of claim 1, wherein the instructions when executed further cause the storage device to:
prevent access to at least one of data or other keys stored on the storage device while the storage device is operating in the key provisioning mode.

3. The storage device of claim 1, wherein the instructions when executed further cause the storage device to:
delete any previously-stored internal keys upon operating in the key provisioning mode.

4. The storage device of claim 1, wherein the instructions when executed further cause the storage device to:
prevent access to the internal key by a provider of the storage device.

5. The storage device of claim 1, wherein the instructions when executed further cause the storage device to:
receive a request to provision a new internal key; and
cause the storage device to operate in the key provisioning mode before at least one of receiving, reading, or decrypting the new internal key.

6. The storage device of claim 1, wherein the instructions when executed further cause the storage device to:
perform at least one operation on the portion of the data; and determine that each operation of the at least one operation corresponds to a respective allowable task, associated with the internal key, before performing the at least one operation.

7. A computer-implemented method, comprising:
causing a storage device of a resource environment to operate in a key provisioning mode wherein access to at least a designated portion of the storage device is prevented;
receiving, at the storage device of a resource environment, an internal key during the key provisioning mode, the storage device including at least one processor configured to perform cryptographic processing;
decrypting the internal key; and
causing the internal key to be securely stored in the storage device.

8. The computer-implemented method of claim 7, further comprising:
preventing a provider of the storage device from having access to the internal key stored by the storage device.

9. The computer-implemented method of claim 7, further comprising:
receiving a request associated with data encrypted under the internal key;
determining, in the storage device, the internal key from a plurality of internal keys stored by the storage device;
decrypting the data using the internal key;
performing at least one operation, associated with the request, on the data using at least one processor of the storage device; and
causing a result of the at least one operation to be transmitted to a destination associated with the request.

10. The computer-implemented method of claim 9, further comprising:
transferring, as part of the at least one operation, at least a portion of the data between the storage device and at least one additional storage device in the resource environment.

11. The computer-implemented method of claim 9, further comprising:
decrypting the data included with the request; and
returning the data, after the decrypting, without storing the data or causing the data to be available outside cryptographic hardware of the storage device.

12. The computer-implemented method of claim 7, further comprising:
enabling at least one operation to be performed on the storage device;
determining the at least one operation is based at least in part upon the internal key, the at least one operation including at least one of a de-duplication operation, a replication operation, or a compression operation.

13. The computer-implemented method of claim 7, wherein:
decrypting the internal key comprises decrypting the internal key using an external key, the internal key is exportable when encrypted, and once decrypted, unexportable from the storage device.

14. The computer-implemented method of claim 7, further comprising:
causing the storage device to operate in the key provisioning mode for decrypting and storing the internal key; and
causing the storage device to operate in an operational mode for performing operations on behalf of the customer.

15. A computer-implemented method, comprising:
causing a storage device of a resource environment to operate in a key provisioning mode wherein access to at least a designated portion of the storage device is prevented;
receiving, at the storage device of a resource environment, data encrypted under an internal key during the key provisioning mode, the storage device including at least one processor configured to perform cryptographic processing; and
decrypting, in the storage device, the data using the internal key.

16. The computer-implemented method of claim 15, further comprising:
causing the storage device to operate in an operational mode wherein the storage device is unable to receive new internal keys.

17. The computer-implemented method of claim 15, wherein the internal key is exportable when encrypted, and once decrypted, unexportable from the storage device.

18. The computer-implemented method of claim 15, further comprising:
performing, using the data, at least one operation, the at least one operation includes aggregating the data, after the decrypting, into a result without storing the data on the storage device or making the data accessible outside the storage device.

19. The computer-implemented method of claim 15, wherein a provider of the storage device is prevented from having access to the internal key or the data after decrypting, in the storage device.

20. The computer-implemented method of claim 18, further comprising:
encrypting the result, using at least one of the internal key or a second key, before the result is exported.

* * * * *